United States Patent
Pi et al.

(10) Patent No.: US 11,589,439 B2
(45) Date of Patent: Feb. 21, 2023

(54) LAMP AND LIGHTING CONTROL METHOD THEREOF

(71) Applicant: ZOPOISE TECHNOLOGY (ZHUZHOU) CO., LTD., Zhuzhou (CN)

(72) Inventors: Bruce Pi, Zhuzhou (CN); Wei Kang, Zhuzhou (CN); Zhixiang Chen, Zhuzhou (CN)

(73) Assignee: ZOPOISE TECHNOLOGY (ZHUZHOU) CO., LTD., Zhuzhou (CN)

(*) Notice: Subject to any disclaimer, the term of this patent is extended or adjusted under 35 U.S.C. 154(b) by 0 days.

(21) Appl. No.: 17/122,980

(22) Filed: Dec. 15, 2020

(65) Prior Publication Data

US 2021/0227662 A1 Jul. 22, 2021

(30) Foreign Application Priority Data

Jan. 17, 2020 (CN) .......................... 202010055701.0

(51) Int. Cl.
*H05B 45/3577* (2020.01)
*H05B 45/14* (2020.01)

(52) U.S. Cl.
CPC ......... *H05B 45/3577* (2020.01); *H05B 45/14* (2020.01)

(58) Field of Classification Search
CPC .... H05B 45/10; H05B 45/14; H05B 45/3577; H05B 45/30; H05B 45/325; H05B 47/11; H05B 47/16
See application file for complete search history.

(56) References Cited

U.S. PATENT DOCUMENTS

| | | | | |
|---|---|---|---|---|
| 7,741,786 B2* | 6/2010 | Lee | ........................ | H05B 47/11 |
| | | | | 315/159 |
| 9,253,853 B2* | 2/2016 | Schröder | ................. | H05B 47/10 |
| 9,538,613 B1* | 1/2017 | Jacobs | ................... | H05B 41/36 |
| 2010/0327764 A1* | 12/2010 | Knapp | .................... | H05B 47/19 |
| | | | | 315/307 |

(Continued)

FOREIGN PATENT DOCUMENTS

| | | | | |
|---|---|---|---|---|
| CA | 3 001 194 A1 | | 10/2019 | |
| CA | 3001194 A1 * | | 10/2019 | ............. H05B 45/20 |

(Continued)

OTHER PUBLICATIONS

EP Search Report in Application No. 20213645.3 dated May 27, 2021.

*Primary Examiner* — Abdullah A Riyami
*Assistant Examiner* — Syed M Kaiser
(74) *Attorney, Agent, or Firm* — Maschoff Brennan (57) ABSTRACT

The embodiment of the present disclosure provides a lamp and a lighting control method thereof. The lighting control method includes: counting a lighting duration of N days before statistical date of a lamp, where N is an integer greater than 1 and less than 11; matching a to-be-executed dimming program from preset multiple dimming programs of the lamp according to a statistical result; and controlling an adaptive power supply of the lamp to switch to the to-be-executed dimming program, which improve the diversity of the lighting control of the lamp, increase the self-learning ability of the lamp, and reduce the maintenance cost of the lighting control of the lamp.

8 Claims, 5 Drawing Sheets

(56) References Cited

U.S. PATENT DOCUMENTS

| | | | | |
|---|---|---|---|---|
| 2011/0069094 A1* | 3/2011 | Knapp | ................ | G09G 3/3426 345/82 |
| 2014/0244063 A1* | 8/2014 | Davis | .................... | H05B 47/19 700/297 |
| 2015/0216016 A1* | 7/2015 | Reed | ..................... | H05B 47/16 315/159 |
| 2015/0305122 A1* | 10/2015 | Saes | ...................... | H05B 45/50 315/129 |

FOREIGN PATENT DOCUMENTS

| | | | | |
|---|---|---|---|---|
| GB | 2497096 A | * | 6/2013 | ............. E01F 9/615 |
| GB | 2497096 A | | 6/2013 | |
| WO | 2007/091175 A1 | | 8/2007 | |

\* cited by examiner

LAMP AND LIGHTING CONTROL METHOD THEREOF

FIELD

The present disclosure relates to the technical field of lamp lighting, in particular to a lamp and a lighting control method thereof.

BACKGROUND

With the development of LED technology, LED lamps have been more and more widely used in people's lives, and LED lamps are often used outdoors, such as LED street lamps or LED landscape lamps.

At the present stage, there are roughly two types of LED street lamps or LED landscape lamps used outdoors. One is that the dimming program has been set at the factory, and the lighting may be performed according to the program after being accessed the power supply during the use, but the control mode is too single, which may lead to waste of resources in areas with distinct seasons. The other is to control multiple lamps through a central controller running control program, but it requires complex control network construction leading to extremely high maintenance cost.

SUMMARY

In view of this, the embodiment of the present disclosure provides a lamp and a lighting control method thereof, which are used to solve the current technical problem of single control mode of LED lamps and high maintenance cost of lighting control.

The embodiment of the present disclosure provides a lamp, including: a lamp body, a counting module, a matching module, an adaptive power supply, and a controller; where, the counting module, the matching module, the adaptive power supply and the controller are arranged inside the lamp body, the controller is electrically connected to the matching module and the adaptive power supply, and the counting module is electrically connected to the matching module;

the counting module is configured to count a lighting duration of N days before statistical date of a lamp, where N is an integer greater than 1 and less than 11;

the matching module is configured to match a to-be-executed dimming program from preset multiple dimming programs of the lamp according to a statistical result; and the controller is configured to control an adaptive power supply of the lamp to switch to the to-be-executed dimming program.

Further, the matching module includes a first calculating unit and a matching unit;

the first calculating unit is configured to obtain an average lighting duration by weighting average the lighting duration of the N days before the statistical date; and the matching unit is configured to match the to-be-executed dimming program according to a standard lighting duration interval in which the average lighting duration is located, where each of the multiple dimming programs corresponds to a standard lighting duration interval.

Further, the lamp further includes a photosensitive sensor, where the photosensitive sensor is arranged on the lamp body and is electrically connected to the controller, and the photosensitive sensor is configured to obtain brightness of an ambient light around the lamp, and the controller is further configured to control the adaptive power supply of the lamp to turn on or turn off according to the brightness of an ambient light around the lamp.

Further, the counting module includes a timer, a second calculating unit, and a counting unit; where, the timer is configured to record a turning on time and a turning off time of the adaptive power supply of the lamp;

the second calculating unit is configured to calculate the lighting duration according to the turning on time and the turning off time; and the counting unit is configured to count the lighting duration of N days before the statistical date of the lamp.

Further, the controller is further configured to control the adaptive power supply of the lamp to be turned on or to be turned off according to the to-be-executed dimming program.

Further, the controller is further configured to adjust a color temperature of the lamp and brightness of different lighting periods of each day according to the to-be-executed dimming program.

The embodiment of the present disclosure further provides a lighting control method, including:

counting a lighting duration of N days before statistical date of a lamp, where N is an integer greater than 1 and less than 11;

matching a to-be-executed dimming program from preset multiple dimming programs of the lamp according to a statistical result; and controlling an adaptive power supply of the lamp to switch to the to-be-executed dimming program.

Further, the matching a to-be-executed dimming program from preset multiple dimming programs of the lamp according to a statistical result, specifically includes:

obtaining an average lighting duration by weighting average the lighting duration of the N days before the statistical date; and matching the to-be-executed dimming program according to a standard lighting duration interval in which the average lighting duration is located, wherein each of the multiple dimming programs corresponds to a standard lighting duration interval.

Further, before the counting a lighting duration of N days before statistical date of a lamp, further includes:

controlling the adaptive power supply of the lamp to turn on or turn off according to brightness of an ambient light around the lamp.

Further, the counting a lighting duration of N days before statistical date of a lamp, specifically includes:

recording a turning on time and a turning off time of the adaptive power supply of the lamp;

calculating the lighting duration according to the turning on time and the turning off time; and counting the lighting duration of N days before the statistical date of the lamp.

Further, the controlling an adaptive power supply of the lamp to switch to the to-be-executed dimming program, specifically includes:

controlling the adaptive power supply of the lamp to be turned on or to be turned off according to the to-be-executed dimming program.

Further, the lighting control method further includes:

adjusting a color temperature of the lamp and brightness of different lighting periods of each day according to the to-be-executed dimming program.

The lamp and the lighting control method of the embodiment of the present disclosure perform multi-mode lighting control to the lamp by counting the lighting duration of N days before the statistical date of a lamp, matching the to-be-executed dimming program from the preset multiple dimming programs of the lamp according to the statistical result, and controlling the adaptive power supply of the lamp to switch to the to-be-executed dimming program, which improve the diversity of the lighting control of the lamp, increase the self-learning ability of the lamp, and reduce the maintenance cost of the lighting control of the lamp.

BRIEF DESCRIPTION OF THE DRAWINGS

In order to describe the technical solutions in the embodiments of the present disclosure or the prior art more clearly, the drawings required to be used for descriptions about the embodiments or the prior art will be simply introduced below. It is apparent that the drawings described below are some embodiments of the present disclosure. Those of ordinary skill in the art may further obtain other drawings according to these drawings without creative work.

DETAILED DESCRIPTION OF EXAMPLE EMBODIMENTS

The embodiments of the present disclosure will be described in detail below in conjunction with the accompanying drawings and examples, so as to fully understand and implement the implementation process of how the present disclosure uses technical means to solve technical problems and achieve technical effects.

For example, certain words are used in the description and claims to refer to specific components. Those skilled in the art should understand that hardware manufacturers may use different terms to refer to the same component. This specification and claims do not use differences in names as a way to distinguish components, but use differences in functions of components as a criterion. "Including" mentioned throughout the description and claims is an inclusive term, therefore, it should be interpreted as "including but not limited to". "Substantially" means that within a range of acceptable errors, those skilled in the art may solve the technical problem and may substantially achieve the technical effect within a certain range of errors. Furthermore, the term of "connection" includes any direct and indirect means of connection herein. Therefore, if it is described in the article that a first device is connected with a second device, it means that the first device may be directly connected with the second device, or indirectly connected to the second device by other device. The following description is the preferred modes of execution for the present disclosure, and the description still aims at illustrating the general principles of the present disclosure, but it is not intended to limit the scope of the present disclosure. The protection scope of the present disclosure shall be subject to the defined by the appended claims.

It is also to be noted that terms "include", "contain" or any other variants thereof are intended to include nonexclusive inclusions, thereby ensuring that a commodity or system including a series of elements not only includes those elements but also includes other elements which are not clearly listed or further includes elements intrinsic to the commodity or the system. Under the condition of no more restrictions, an element defined by statement "including a/an" does not exclude existence of another element which is the same in a commodity or system including the element.

SPECIFIC EMBODIMENT

First Embodiment

Figure 1:
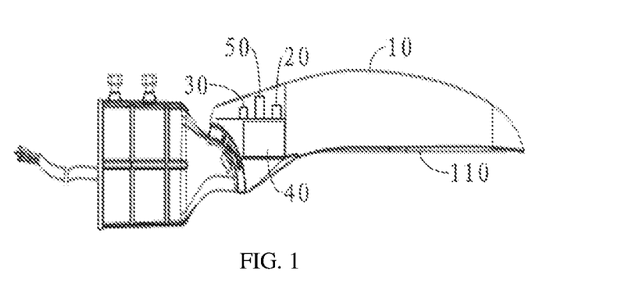
FIG. 1 is a schematic diagram of a cross-sectional structure of a lamp according to a first embodiment of the present disclosure.

Please refer to FIG. 1, which is a schematic diagram of a cross-sectional structure of a lamp according to a first embodiment of the present disclosure. The lamp includes a lamp body 10, a counting module 20, a matching module 30, an adaptive power supply 40 and a controller 50.

Here, as shown in the drawings, this embodiment takes a street lamp as an example for description, but does not constitute a limitation on the type of lamp of the present disclosure. It is conceivable that it may also be a floodlight for landscape lighting in public areas, etc. The lamp body 10 includes, but is not limited to, an elliptical shell-like structure, one side of the elliptical shell-like structure is provided with an opening, and a light source component 110 is provided on the opening, the lamp body 10 and the light source component 110 form a sealed structure, and the counting module 20, the matching module 30, the adaptive power supply 40, and the controller 50 are all arranged inside the lamp body 10, that is, arranged in the sealed structure. The light source component 110 includes but is not limited to being composed of a light source substrate, an LED light source, a lens and a sealing ring, etc., not shown in the above structural diagram. The light source substrate is arranged on the opening and is electrically connected to the adaptive power supply 40, the LED light source is disposed on the light source substrate to form a light-emitting surface, the lens is arranged on the light source substrate and covers over the LED light source, a closed space is formed between the lens and the light source substrate, the LED light source is located in the closed space, and a sealing ring is provided between the lens and the light source substrate to increase the sealing of the closed space and improve the waterproof performance and safety of the lamp. The sealing ring here is generally arranged around the outer periphery of the LED light source. The controller 50 is electrically connected to the matching module 30 and the adaptive power supply 40 respectively, and the counting module 20 and the matching module 30 are electrically connected. Specifically, the counting module 20, the matching module 30, and the controller 50 are respectively provided on a circuit board and the electrical connection therebetween is achieved by the lead on the circuit board.

The counting module 20 is configured to count counting a lighting duration of N days before statistical date of a lamp, where N is an integer greater than 1 and less than 11. The lighting duration here generally refers to the duration from the light-on time in the evening of the day to the light-off time in the morning of the next day. Taking 15th as the statistical date and N being 3 as an example, the counting module 20 counts the lighting duration of N days before the statistical date of the lamp refers to: the counting module 20 respectively counts the lighting durations of 12th, 13th and 14th, for example, the statistical results are 9 h, 9.1 h and 9.2 h respectively.

The matching module 30 is configured to match a to-be-executed dimming program from preset multiple dimming programs of the lamp according to the statistical result. The memory of the lamp stores multiple dimming programs, such as winter dimming program, summer dimming program, spring and autumn dimming program, etc. Of course, the above dimming programs are just examples. In practical applications, there may be other various dimming programs that are also stored in the memory of the lamp. The matching module 30 receives the statistical result transmitted by the counting module 20, matches multiple dimming programs according to the structure of the statistical result, selects the corresponding to-be-executed dimming program, and transmits it to the controller 50.

The controller 50 is configured to an adaptive power supply of the lamp to switch to the to-be-executed dimming program. Specifically, the adaptive power supply 40 generally accepts program control, sensor control or artificial control. After the controller 50 receives the to-be-executed dimming program transmitted by the matching module 30, it controls the adaptive power supply 40 to switch to the to-be-executed dimming program, so that the adaptive power supply 40 executes the to-be-executed dimming program to supply power to the light source component 110. Here is mainly to close and open the circuit switch of the light source component 110 at the time agreed by the program, that is, in accordance with the time agreed of the to-be-executed dimming program to turn on or turn off the lamp. As such, the light-on time of the lamp is not static, but is determined by the lighting duration of the lamp N days before, so as to realize the multi-mode lighting control of the lamp, improve the diversity of lighting control of the lamp, increase the self-learning ability of the lamp and reduce the maintenance cost of lighting control of the lamp.

Figure 2:
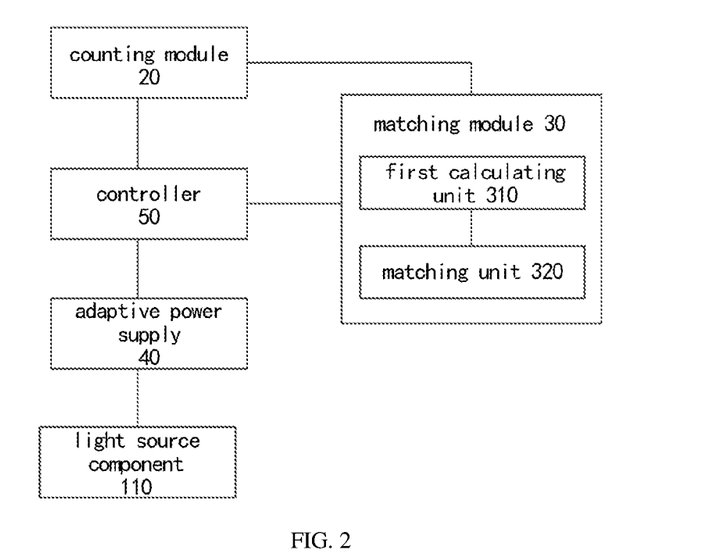
FIG. 2 is a block diagram of a lamp according to a first embodiment of the present disclosure.

Furthermore, please refer to FIG. 2, which is a block diagram of a lamp according to a first embodiment of the present disclosure. The matching module 30 includes a first calculating unit 310 and a matching unit 320.

The first calculating unit 310 is configured to obtain an average lighting duration by weighting average the lighting duration of the N days before the statistical date.

The matching unit 320 is configured to match the to-be-executed dimming program according to a standard lighting duration interval in which the average lighting duration is located, where each of the multiple dimming programs corresponds to a standard lighting duration interval.

Figure 3:
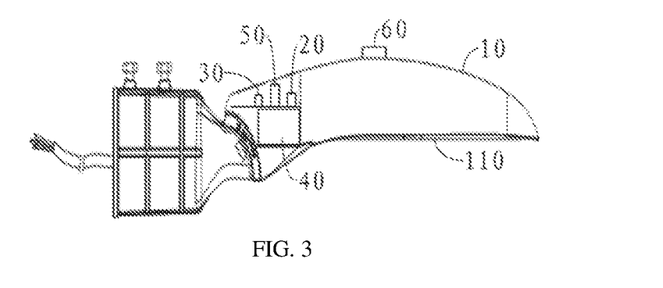
FIG. 3 is a schematic diagram of another cross-sectional structure of a lamp according to a first embodiment of the present disclosure.

In addition, please refer to FIG. 3, which is a schematic diagram of another cross-sectional structure of a lamp according to a first embodiment of the present disclosure. The lamp further includes a photosensitive sensor 60, which is arranged on the lamp body 10 and is electrically connected to the controller 50. The photosensitive sensor 60 is configured to obtain brightness of an ambient light around the lamp, and the controller 50 is further configured to control the adaptive power supply 40 of the lamp to turn on or turn off according to the brightness of an ambient light around the lamp.

The photosensitive sensor 60 is generally arranged at the top of the outer of the lamp body 10, and is configured to fully sense the external ambient light, so that it may obtain the brightness of the ambient light around the lamp. The photosensitive sensor 60 transmits the acquired brightness data of the ambient light of the lamp to the controller 50, and the controller 50 is also configured to control the adaptive power supply 40 of the lamp to turn on or turn off according to the change of the brightness of the ambient light of the lamp. For example, when the brightness of the ambient light around the lamp becomes larger and greater than a certain value, the adaptive power supply 40 of the lamp is controlled to switch off the power supply circuit, and when the value becomes smaller and smaller than a certain value, the adaptive power supply 40 of the lamp is controlled to close the power supply circuit switch, that is, to realize the photosensitive control of the switch of the lamp.

Figure 4:
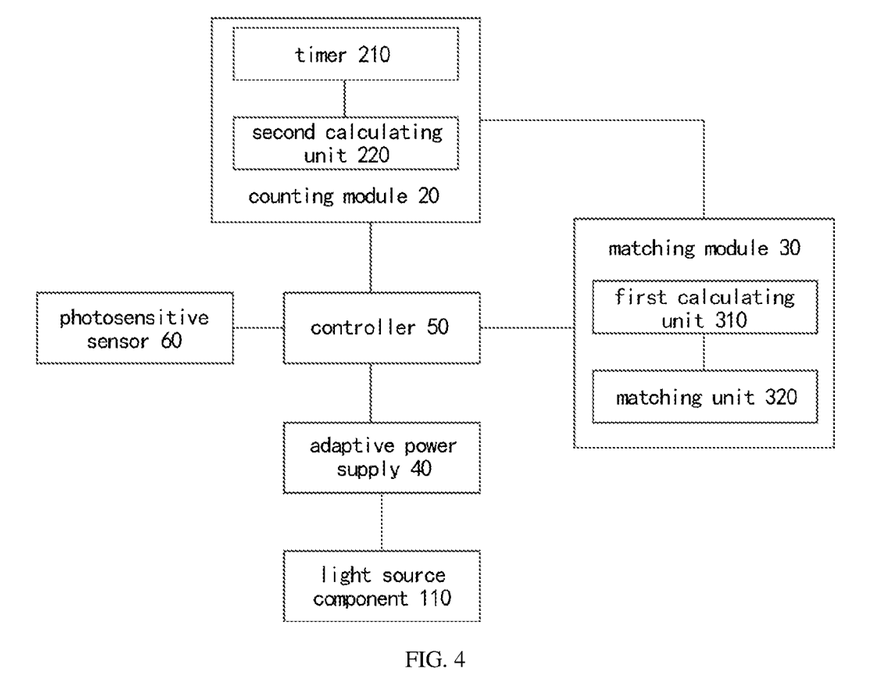
FIG. 4 is another block diagram of a lamp according to a first embodiment of the present disclosure.

Furthermore, please refer to FIG. 4, which is another block diagram of a lamp according to a first embodiment of the present disclosure. The counting module 20 includes a timer 210, a second calculating unit 220, and a counting unit 230.

The timer 210 is configured to record a turning on time and a turning off time of the adaptive power supply of the lamp.

The second calculating unit 220 is configured to calculate the lighting duration according to the turning on time and the turning off time.

The counting unit 230 is configured to count the lighting duration of N days before the statistical date of the lamp.

In addition, the controller 50 is also configured to control the adaptive power supply of the lamp to be turned on or to be turned off according to the to-be-executed dimming program, that is, the controller 50 controls the adaptive power supply 40 of the lamp to be turned on or to be turned off according to the corresponding dimming program.

Besides, the controller 50 is further configured to adjust the color temperature of the lamp and the brightness of different lighting periods of each day according to the to-be-executed dimming program.

Specifically, as described above, the multiple dimming programs include, for example, the winter dimming program, the summer dimming program, and the spring and autumn dimming program, etc., and the to-be-executed dimming program may be any one of the above dimming programs. The controller 50 may adjust the color temperature of the lamp according to the difference of the dimming program, and when the dimming program is switched to the summer dimming program, the controller 50 controls the lamp to adjust the color temperature to a cool tone, such as adjusting the color temperature to 5000K, when the dimming program is switched to the winter dimming program or the spring and autumn dimming mode, the controller 50 controls the lamp to adjust the color temperature to a warm tone, such as adjusting the color temperature to 4000K. The controller 50 may adjust the brightness of the lamp at different lighting periods each day according to the dimming program. The brightness herein of the different lighting periods each day is generally related to the lighting requirements of different lighting periods. For example, when the lamp is just turned on, the lighting requirements are generally the largest and the lighting requirements before turning off the lamp is second. The lighting requirements are generally small in the middle of the night. Different dimming programs may also have certain differences in the above requirements. At this time, the controller 50 is applied to control the current flow from the adaptive power supply 40 to the light source component 110 of the power supply, or to control the output voltage of the adaptive power supply 40, to realize the brightness control of the lamp at different lighting periods every day.

Second Embodiment

Figure 5:
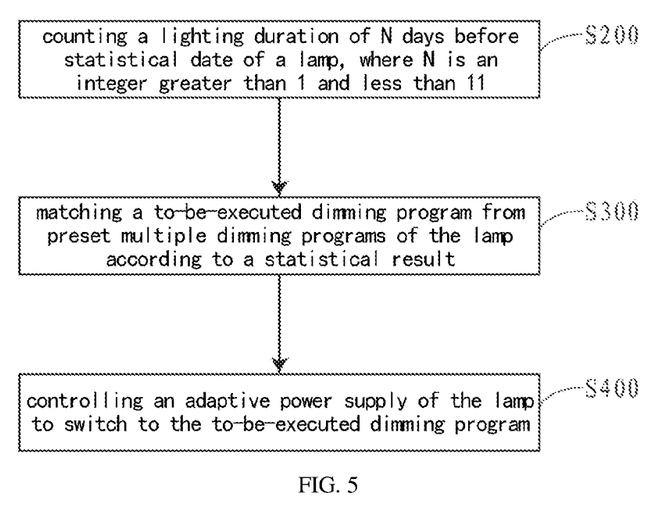
FIG. 5 is a flowchart of a lighting control method according to a second embodiment of the present disclosure.

Please refer to FIG. 5, which is a flowchart of a lighting control method according to a second embodiment of the present disclosure. The lighting control method includes:

step S200, counting a lighting duration of N days before statistical date of a lamp, where N is an integer greater than 1 and less than 11;

step S300, matching a to-be-executed dimming program from preset multiple dimming programs of the lamp according to a statistical result; and step S400, controlling an adaptive power supply of the lamp to switch to the to-be-executed dimming program.

Specifically, in step S200, the lighting duration of N days before the statistical date is counted. The lighting duration here refers to the duration between the light-on time in the evening of the day and the light-off time of the next morning. N is an integer greater than 1 and less than 11, that is, N is any number 2, 3, 4 . . . 10, which can be selected according to actual needs. The reason why N is any number of 2, 3, 4 . . . 10 is because if N is selected as 1, its randomness is too strong and not accurate enough; if N is selected as other numbers greater than 10, the selected historical data is too long and has no reference significance. It is well known that the change of the natural light duration of an area in a period of time (usually a week) is uniform and small, that is, it is more accurate to determine the next lighting duration by the lighting duration of the previous week, and the data that is too far away is meaningless and even causes the deviation of the result to be larger. Therefore, in a preferred embodiment, N is generally an integer greater than 1 and less than 6 to ensure the accuracy of the data. Taking 15th as the statistical date and N being 3 as an example, the counting module 20 counts the lighting duration of N days before the statistical date of the lamp refers to: the counting module 20 respectively counts the lighting durations of 12th, 13th and 14th, for example, the statistical results are 9 h, 9.1 h and 9.2 h respectively.

Continuing the above step S200, in step S300, the memory of the lamp stores multiple dimming programs, such as winter dimming program, summer dimming program, and spring and autumn dimming program, etc. Of course, the above dimming programs are just examples. In practical applications, there may be other various dimming programs that also stored in the memory of the lamp. These dimming programs are used to control the lighting duration of the lamp, but are not limited to the lighting duration of the lamp. For example, the winter dimming program used in winter may control the lamp to have a longer lighting duration, and the summer dimming program used in summer may control the lamp to have a shorter lighting duration, such that the lighting duration of the lamp matches the natural lighting duration, thereby saving power resources. According to the above statistical results of the lighting duration N days before the statistical date, the dimming program matching the statistical structure is selected from the preset multiple dimming programs as the corresponding to-be-executed dimming program. If the results of the above statistics are that the lighting duration of the three days before the statistical date is 9 h, 9.1 h and 9.2 h, then the matching dimming program may be the spring and summer dimming program, and the spring and summer dimming program is selected as the to-be-executed dimming program.

Continuing the above step S300, in step S400, after matching the corresponding to-be-executed dimming program, the adaptive power supply of the lamp is controlled to switch to the to-be-executed dimming program. Specifically, the adaptive power supply generally accepts program control, sensor control or artificial control. The adaptive power supply being switched to the to-be-executed dimming program refers that the adaptive power supply is controlled by the to-be-executed dimming program to make the adaptive power supply supplies power to the light source component of the lamp according to the to-be-executed dimming program. Here is mainly to close and open the circuit switch of the light source component at the time agreed by the program, that is, in accordance with the time agreed of the to-be-executed dimming program to turn on or turn off the lamp. As such, the light-on time of the lamp is not static, but is determined by the lighting duration of the lamp N days before, so as to realize the multi-mode lighting control of the lamp, improve the diversity of lighting control of the lamp, increase the self-learning ability of the lamp and reduce the maintenance cost of lighting control of the lamp.

Figure 6:
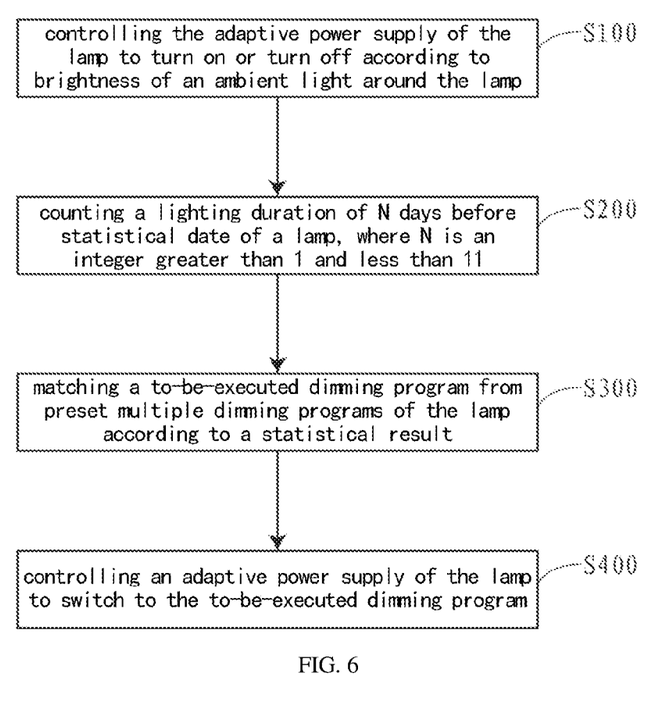
FIG. 6 is another flowchart of a lighting control method according to a second embodiment of the present disclosure.

Further, please refer to FIG. 6, which is another flowchart of a lighting control method according to a second embodiment of the present disclosure. On the basis of the above embodiment, before the step S200, i.e., counting the lighting duration of N days before the statistical date of the lamp, the lighting control method further includes:

step S100, controlling the adaptive power supply of the lamp to turn on or turn off according to brightness of an ambient light around the lamp.

Specifically, the lamp is provided with a photosensitive sensor, which is generally arranged at the top of the outer of the lamp body, and is configured to fully sense the external ambient light, so that it may obtain the brightness of the ambient light around the lamp. The lamp may also achieve the control of the turning on/turning of according to the brightness of the ambient light around the lamp, that is, the adaptive power supply of the lamp is controlled to turn on or turn off according to the change of the brightness of the ambient light of the lamp. For example, when the brightness of the ambient light around the lamp becomes larger and greater than a certain value, the adaptive power supply of the lamp is controlled to switch off the power supply circuit, and when the value becomes smaller and smaller than a certain value, the adaptive power supply of the lamp is controlled to close the power supply circuit switch, that is, to realize the photosensitive control of the switch of the lamp.

Figure 7:
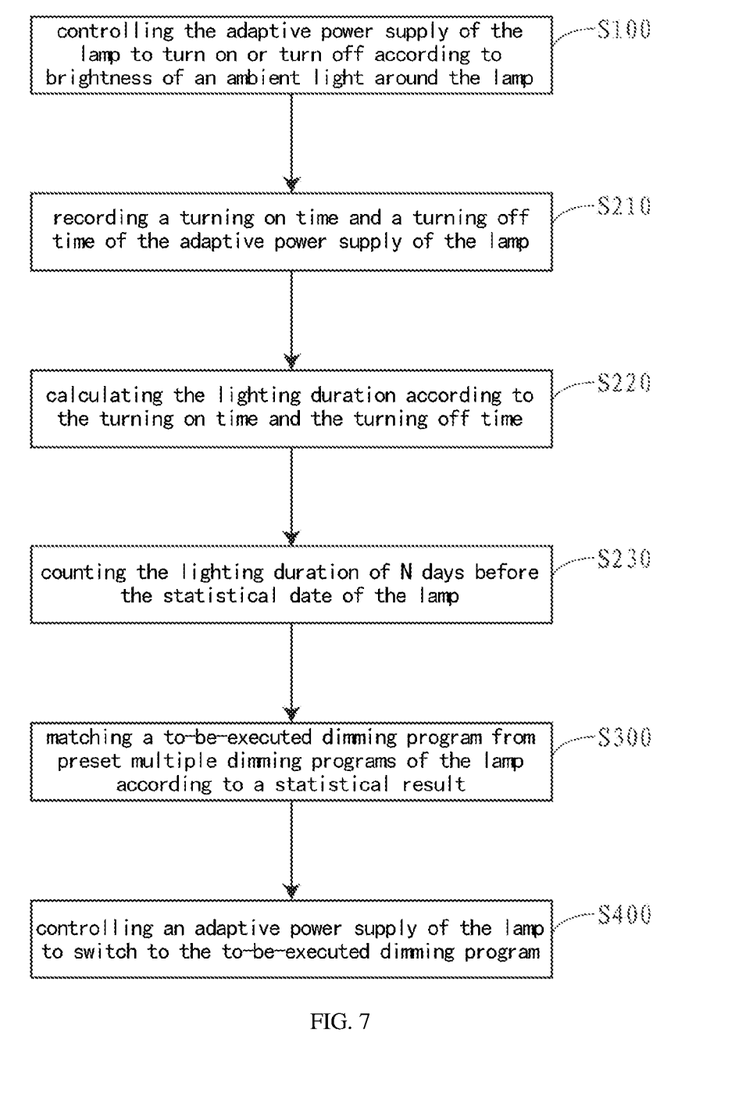
FIG. 7 is another flowchart of a lighting control method according to a second embodiment of the present disclosure.

Furthermore, please refer to FIG. 7, which is another flowchart of a lighting control method according to a second embodiment of the present disclosure. On the basis of the above embodiment, the step S200, i.e., counting the lighting duration of N days before the statistical date of the lamp, specifically includes:

step S210: recording a turning on time and a turning off time of the adaptive power supply of the lamp;

step S220: calculating the lighting duration according to the turning on time and the turning off time; and step S230: counting the lighting duration of N days before the statistical date of the lamp.

Specifically, in step S210, a timer is provided in the lamp, and the timer is used to record the turning on time and the turning off time of the adaptive power supply of the lamp. Here, the following Table 1 shows the turning on time and the turning off time of the adaptive power supply of the lamp recorded by the timer:

TABLE 1

|  | ... | 10th | 11th | 12 h | 13th | 14th | 15th | 16th | ... |
|---|---|---|---|---|---|---|---|---|---|
| turning on time | ... | 19:20 | 18:20 | 19:30 | 19:35 | 19:45 | 19:25 | 19:30 | ... |
| turning off time | ... | 5:10 | 6:10 | 5:00 | 5:05 | 5:00 | 5:05 | 5:05 | ... |
| lighting duration | ... | 9 h 30 m | 11 h 30 m | 9 h 30 m | 9 h 30 m | 9 h 45 m | 9 h 40 m | 9 h 35 m | ... |

In step S220, the lamp obtains the light duration by performing difference calculating on the two adjacent turning on time and turning off time according to the turning on time and the turning off time of the adaptive power supply of the lamp recorded by the timer. In the difference calculating, the difference between the turning on time and the turning off time of two adjacent days is generally calculated, rather than the difference between the turning on time and the turning off time of the same day. This is because the lamp is generally turned on in the evening of the previous day, and turned off in the next morning.

Continuing the above-mentioned step S220, in step S230, after obtaining multiple lighting durations through the difference calculation, the different lighting durations are further counted. Specifically, the lighting durations of N days before statistical date are counted. N is an integer greater than 1 and less than 11. For the specific value of N here, reference may be made to the description of the above embodiment, which will not be repeated here. In addition, in the statistics, the data that significantly deviates from the normal lighting duration should be excluded. As described in Table 1, the lighting duration of the lamp on the 11th is 11 hours and 30 minutes, and the other lighting durations before and after that day are between 9 hours and 30 minutes and 10 hours, the lighting duration of the lamp on the 11th is obviously beyond the normal lighting duration, and it should be excluded in the statistics. If the data after the excluded processing does not meet the requirement of N days, the lighting duration of the previous day's normal value is selected to fill in.

Figure 8:
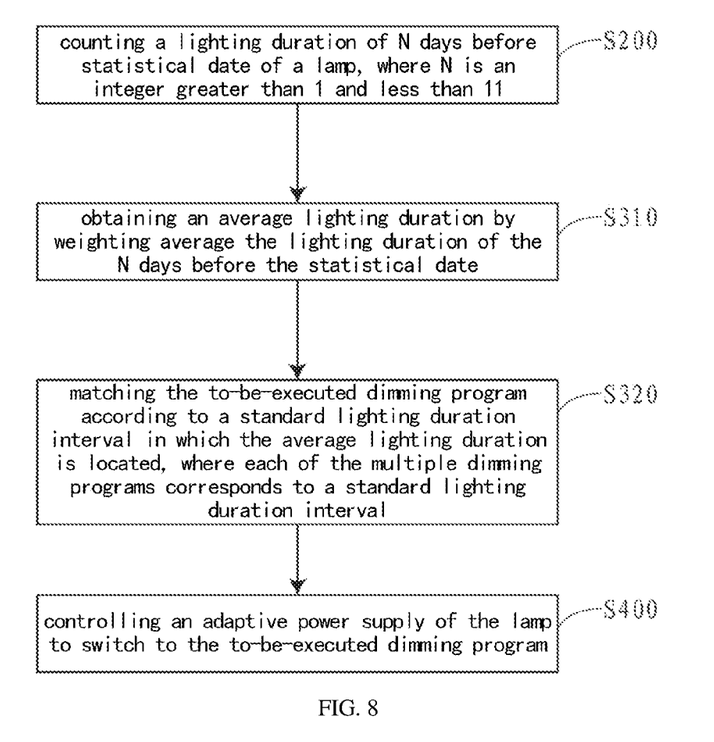
FIG. 8 is another flowchart of a lighting control method according to a second embodiment of the present disclosure.

In addition, please refer to FIG. 8, which is another flowchart of a lighting control method according to a second embodiment of the present disclosure. In step S300, i.e., the matching a to-be-executed dimming program from preset multiple dimming programs of the lamp according to a statistical result, specifically includes:

step S310: obtaining an average lighting duration by weighting average the lighting duration of the N days before the statistical date; and step S320, matching the to-be-executed dimming program according to a standard lighting duration interval in which the average lighting duration is located, where each of the multiple dimming programs corresponds to a standard lighting duration interval.

Specifically, in step S310, the counted lighting duration of N days before the statistical date is weighted average, and the obtained average value is the average lighting duration of N days before the statistical date. It should be noted if the counted lighting duration significantly deviates from the normal duration value, it should be excluded, and if N lighting durations are not reached after the excluded processing, the previous normal value of the excluded value will generally be used as a supplement to ensure the accuracy of the obtained average lighting duration, which is shown in Table 2 below:

TABLE 2

|  | 10th | 11th | 12th | 13th | 14th | 15th |
|---|---|---|---|---|---|---|
| lighting duration | 9 h 30 m | 11 h 30 m (excluded) | 9 h 30 m | 9 h 30 m | 9 h 45 m | 9 h 40 m |
| average lighting duration of 5 days before 16th | | | 9 h 35 m | | | |

In step S320, the multiple dimming programs are stored in the memory of the lamp, respectively corresponds to a standard lighting duration interval. Specifically, as shown in the following Table 3, the standard lighting duration intervals of the summer dimming program, the spring and autumn dimming program and the winter dimming program are respectively given. After the average lighting duration is obtained in the above step S310, it is compared with multiple standard lighting duration intervals, such as the obtained average lighting duration is 9:35, according to Table 3, the corresponding standard lighting duration interval is 9:30-10:30, then the corresponding dimming program at this time is the summer dimming program, that is, according to the standard lighting duration interval where the average lighting duration is located, the summer dimming program is matched. In this way, the summer dimming program is used as the to-be-executed dimming program.

TABLE 3

|  | summer dimming program | spring and autumn dimming program | winter dimming program |
|---|---|---|---|
| average lighting duration interval | 9 h 30 m~10 h 30 m | 10 h 31 m~11 h 30 m | 11 h 31 m~14 h 30 m |

Further, the method for controlling the adaptive power supply of the lamp to switch to the to-be-executed dimming program specifically includes: controlling the adaptive power supply of the lamp to be turned on or to be turned off according to the to-be-executed dimming program.

Specifically, after matching the to-be-executed dimming program, the controller of the lamp will control the adaptive power supply of the lamp to execute the corresponding dimming program. The specific performance is that the controller will control the adaptive power supply of the lamp according to the to-be-executed dimming program to close or disconnect the power supply circuit for supplying electric energy to the light source component of the lamp, so that the lamp is turned on or turned off according to the to-be-executed dimming program, to match with the natural lighting, such as lighting at dark and extinguishing at dawn, avoiding the waste of electricity and energy caused by lighting during the day, and/or lighting failures caused by not lighting up in time after dark, and improving the experience of using lamp.

Furthermore, the lighting control method further includes: adjusting a color temperature of the lamp and brightness of different lighting periods of each day according to the to-be-executed dimming program.

Specifically, please refer to the following Tables 4-6, which respectively show the brightness adjustment and color temperature adjustment of the lamp under the summer dimming program, the spring and autumn dimming program, and the winter dimming program.

TABLE 4 summer dimming program

| brightness | 100% | 80% | 50% | 100% |
|---|---|---|---|---|
| duration | 4 h | 2 h | 2 h | continued to being turned off |
| selected color temperature | | | 5000K | |

TABLE 5 spring and autumn dimming program

| brightness | 100% | 80% | 50% | 100% |
|---|---|---|---|---|
| duration | 4 h | 2 h | 3 h | continued to being turned off |
| selected color temperature | | | 4000K | |

TABLE 6 winter dimming program

| brightness | 100% | 80% | 50% | 100% |
|---|---|---|---|---|
| duration | 4 h | 2 h | 4 h | continued to being turned off |
| selected color temperature | | | 4000K | |

The to-be-executed dimming program may be any one of the above-mentioned summer dimming program, the spring-autumn dimming program, and the winter dimming program. Only three dimming programs are shown as examples. However, there may be other dimming programs in actual applications, which do not constitute the exclusion of other dimming programs.

The lamp can adjust the color temperature of the lamp according to the different dimming program to improve the diversified needs of the lamp lighting. For example, when the dimming program is switched to the summer dimming program, the lamp is controlled to adjust the color temperature to a cool tone, such as adjusting the color temperature to 5000K, so that people have a cool feeling in the hot summer night; when the dimming program is switched to the winter dimming program or the spring and autumn dimming mode, the control 50 controls the lamp to adjust the color temperature to a warm tone, such as adjusting the color temperature to 4000K, so that people have a warm feeling at night in the corresponding season, thereby enhancing the experience of using the lamp and improving the quality of the lamp.

In addition, the lamp may further adjust the brightness of the lamp at different lighting periods each day according to the dimming program. The brightness herein of the different lighting periods each day is generally related to the lighting requirements of different lighting periods. For example, when the lamp is just turned on, the lighting requirements are generally the largest and the lighting requirements before turning off the lamp is second. The lighting requirements are generally small in the middle of the night. Different dimming programs may also have certain differences in the above requirements. At this time, the controller is applied to control the current flow from the adaptive power supply to the light source component 110 of the power supply, or to control the output voltage of the adaptive power supply, to realize the brightness control of the lamp at different lighting periods every day, meet people's lighting needs at different times of the day, avoid the waste of electric energy caused by continuously maintaining high-power lighting when the lighting demand is low, and further improve the intelligent demand and energy-saving and environmental protection performance of the lamp.

It should be noted that, under the conditions of the structures being not conflicted, the structures of the various parts mentioned in the various implementations of the first embodiment above can be combined with each other. To avoid repetition, the technical solutions obtained after the combination are not repeated here, but the technical solution obtained after the combination should also belong to the protection scope of the present disclosure. The method embodiment of the above second embodiment is an embodiment of the lamp lighting method corresponding to the embodiment of the lamp structure of the first embodiment, which may refer to each other for unclear points.

It is finally to be noted that the above embodiments are adopted not to limit but only to describe the technical solutions of the present disclosure. Although the present disclosure has been described with reference to the above-mentioned embodiments in detail, those of ordinary skill in the art should know that modifications may still be made to the technical solutions recorded in each embodiment or equivalent replacements may be made to part of technical features therein. These modifications or replacements do not make the essences of the corresponding technical solutions depart from the spirit and scope of the technical solutions of each embodiment of the present disclosure.

What is claimed is:

1. A lighting control method, comprising:
counting a lighting duration of a lamp of N days before performing the counting, wherein N is an integer greater than 1 and less than 11;
matching a to-be-executed dimming program from preset multiple dimming programs of the lamp according to a counting result; and
controlling an adaptive power supply of the lamp to switch to the to-be-executed dimming program, and adjusting a color temperature of the lamp and brightness of different lighting periods of each day according to the to-be-executed dimming program; wherein the color temperature is adjusted seasonally,
wherein, the matching the to-be-executed dimming program from the preset multiple dimming programs of the lamp according to the counting result, specifically comprising:
obtaining an average lighting duration by weighting average the lighting duration of the N days before performing the counting; and
matching the to-be-executed dimming program according to a standard lighting duration interval in which the average lighting duration is located, wherein each of the multiple dimming programs corresponds to a standard lighting duration interval.

2. The lighting control method according to claim 1, wherein, before the counting the lighting duration of the lamp of N days before performing the counting, further comprising:
controlling the adaptive power supply of the lamp to turn on or turn off according to brightness of an ambient light around the lamp.

3. The lighting control method according to claim 2, wherein, the counting the lighting duration of the lamp of N days before performing the counting, specifically comprises:

recording a turning on time and a turning off time of the adaptive power supply of the lamp;

calculating the lighting duration according to the turning on time and the turning off time; and counting the lighting duration of the lamp of N days before performing the counting.

4. The lighting control method according to claim 1, further comprising:

controlling the adaptive power supply of the lamp to be turned on or to be turned off according to the to-be-executed dimming program.

5. A lamp, comprising: a lamp body, a counting module, a matching module, an adaptive power supply, and a controller; wherein, the counting module, the matching module, the adaptive power supply and the controller are arranged inside the lamp body, the controller is electrically connected to the matching module and the adaptive power supply, and the counting module is electrically connected to the matching module;

the counting module is configured to count a lighting duration of a lamp of N days before performing the counting, wherein N is an integer greater than 1 and less than 11;

the matching module is configured to match a to-be-executed dimming program from preset multiple dimming programs of the lamp according to a counting result;

the controller is configured to control an adaptive power supply of the lamp to switch to the to-be-executed dimming program, and adjust a color temperature of the lamp and brightness of different lighting periods of each day according to the to-be-executed dimming program;

the color temperature is adjusted seasonally;

the matching module comprises a first calculating unit and a matching unit;

the first calculating unit is configured to obtain an average lighting duration by weighting average the lighting duration of the N days before performing the counting; and the matching unit is configured to match the to-be-executed dimming program according to a standard lighting duration interval in which the average lighting duration is located, wherein each of the multiple dimming programs corresponds to a standard lighting duration interval.

6. The lamp according to claim 5, further comprising a photosensitive sensor, wherein the photosensitive sensor is arranged on the lamp body and is electrically connected to the controller, and the photosensitive sensor is configured to obtain brightness of an ambient light around the lamp, and the controller is further configured to control the adaptive power supply of the lamp to turn on or turn off according to the brightness of an ambient light around the lamp.

7. The lamp according to claim 6, wherein, the counting module comprises a timer, a second calculating unit, and the counting module; wherein, the timer is configured to record a turning on time and a turning off time of the adaptive power supply of the lamp;

the second calculating unit is configured to calculate the lighting duration according to the turning on time and the turning off time; and the counting unit is configured to count the lighting duration of the lamp of N days before performing the counting.

8. The lamp according to claim 5, wherein, the controller is further configured to control the adaptive power supply of the lamp to be turned on or to be turned off according to the to-be-executed dimming program.

* * * * *